March 26, 1968        D. M. HARVEY        3,374,720
SELECTOR ALLOWING FLASH OR NON-FLASH CAMERA
OPERATION WITH IN-PLACE FLASHLAMPS
Filed July 12, 1965        2 Sheets-Sheet 1

DONALD M. HARVEY
INVENTOR.

BY R. Frank Smith
Thomas R Lampe
ATTORNEYS

March 26, 1968  D. M. HARVEY  3,374,720
SELECTOR ALLOWING FLASH OR NON-FLASH CAMERA
OPERATION WITH IN-PLACE FLASHLAMPS
Filed July 12, 1965  2 Sheets-Sheet 2

DONALD M. HARVEY
INVENTOR.

BY R. Frank Smith
Thomas R. Lampe

ATTORNEYS

United States Patent Office 3,374,720
Patented Mar. 26, 1968

3,374,720
SELECTOR ALLOWING FLASH OR NON-FLASH CAMERA OPERATION WITH IN-PLACE FLASH-LAMPS
Donald M. Harvey, Rochester, N.Y., assignor to Eastman Kodak Company, Rochester, N.Y., a corporation of New Jersey
Filed July 12, 1965, Ser. No. 471,013
10 Claims. (Cl. 95—11.5)

ABSTRACT OF THE DISCLOSURE

Either flash or non-flash operation can be chosen with the flashcube in place at all times. In one embodiment the camera has both a flash shutter release button and a non-flash button. In another embodiment the camera has a single shutter release button and a selector lever having a flash position and a non-flash position. The selector apparatus can be separate from or part of the indexing means and has a first position in which it prevents indexing and maintains the flash circuit open and a second position in which it permits indexing and permits closing of the flash circuit.

---

The present invention relates to alternative switching arrangements for manual selection of either flash or daylight mode of operation in cameras utilizing a rotatable multilamp flash attachment of the type disclosed in co-pending Kottler et al. U.S. application Ser. No. 417,914, now Patent No. 3,327,105, filed Dec. 14, 1964. More particularly, the invention relates to means whereby a single manual operation (1) prevents indexing or rotation of such multilamp flash attachment and (2) opens the camera synchroflash circuit so that inadvertant actuation of a flash bulb is precluded.

With the increased use of cameras employing flash attachments of the type described in aforementioned U.S. application Ser. No. 417,914, it is desirable to provide a means for preventing inadvertent actuation of such an attachment. The failure of previous cameras to employ such means has resulted in the unnecessary wear and tear of the indexing or rotating mechanism through repeated use and the inconvenience and distraction caused the operator due to inadvertent flash and/or indexing of the attachment when such operations are not desired.

It is therefore an object of this invention to provide a compact means, simple in construction, which obviates the inconvenience of inadvertent actuation by simultaneously deactivating the attachment drive mechanism and camera synchroflash circuit.

The above object has been attained by providing various mechanical and electrical switching arrangements for providing positive means for preventing indexing and flash actuation of a multilamp flash attachment through a simple, manually actuated expedient.

Other objects of the invention will appear from the following description, reference being made to the accompanying drawings, wherein.

Figure 1:
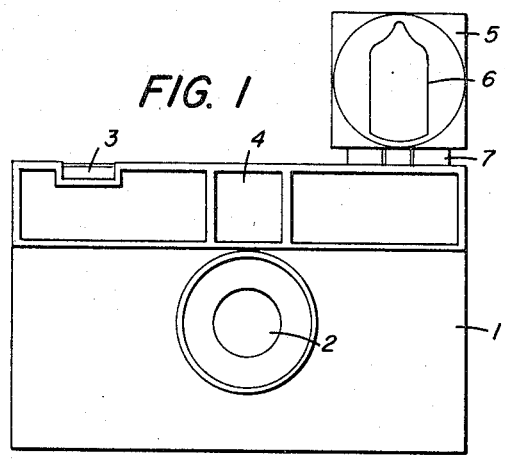
FIG. 1 is a frontal view of a camera employing a multilamp flash attachment.

Referring to FIG. 1, a conventional camera 1 is shown having a a conventional objective lens 2, shutter release button 3 and view finder window 4. A multilamp flash attachment 5 as described in the aforementioned Kottler et al. U.S. application Ser. No. 417,914 is disposed on the camera and adapted to be selectively positioned on the camera for sequential firing of the associated flash lamps 6.

Figure 2:
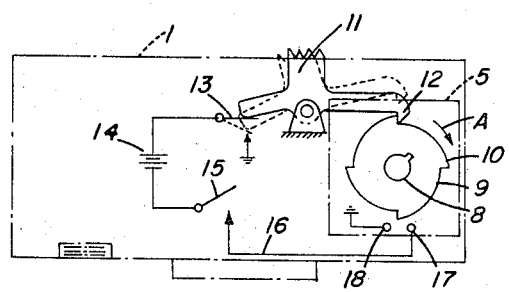
FIG. 2 is a partially schematic illustration of one embodiment of the present invention.
Figure 3:
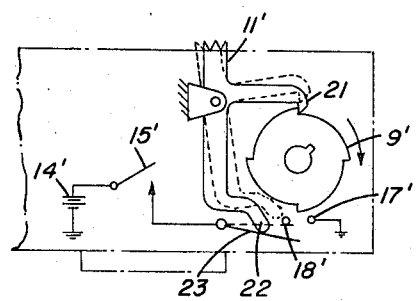
FIG. 3 is a view similar to that shown in FIG. 2 illustrating another form of the invention.
Figure 4:
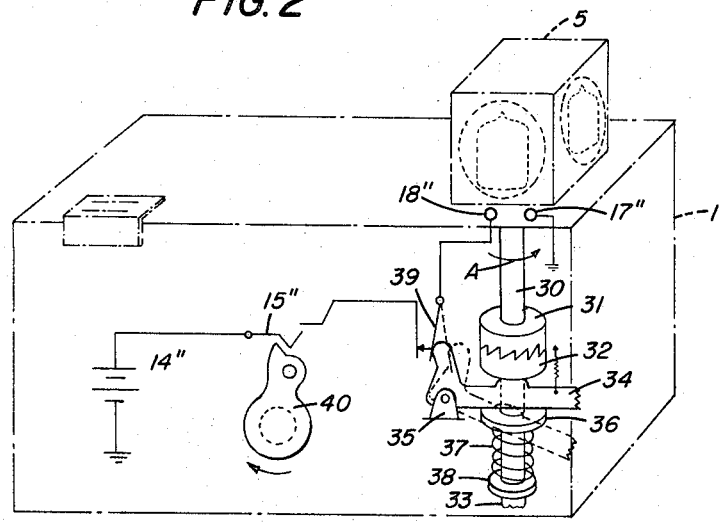
FIG. 4 is an isometric, partial schematic presentation of an additional embodiment of the present invention and its operative relationship with an associated camera and multilamp flash attachment.

In the embodiments shown in FIGS. 2-4, the selection of flash or non-flash camera operation is made by selecting one of two possible positions for a locking device.

In FIG. 2 is shown a schematic presentation of the combined switching and locking device constituting the present invention. To more clearly present the arrangement of the device with respect to the camera and rotatable lamp attachment, the camera 1 and attachment 5 are illustrated in phantom. The socket 7 in which the attachment is mounted (FIG. 1) is rigidly mounted on spindle 8 which is rotatably journalled in the camera housing in any suitable manner. A sprocket wheel 9 is keyed to spindle 8 in any suitable fashion for rotatable movement therewith. A series of projections 10 are located on the periphery of sprocket wheel 9 at substantially 90° intervals.

A suitable drive mechanism (not shown) is normally provided to index the spindle 8, and therefore the socket 7 and attachment 5, in 90° increments when the flash is to be used. Such a mechanism is disclosed in the co-pending Beach U.S. application Ser. No. 485,016, filed May 24, 1965, and forms no part of the present invention. It is necessary for proper understanding of the present invention to be aware only that a yieldable drive means, such as a slip clutch, is employed to transmit rotational movement to the multilamp flash attachment upon winding of the film. An associated ratchet means is employed to restrict such rotatable movement to 90° increments. It should be understood that sprocket wheel 9 is disposed in the transmission system between the yieldable drive means and the flash attachment sprocket. In this manner, if rotational movement of the sprocket wheel is somehow halted, movement of the multilamp flash attachment would also be halted, and the elements of the yieldable drive means, such as the slip clutch elements, would merely slip with respect to one another upon winding of the film, resulting in no movement of the attachment.

Pivotally mounted in any suitable fashion on the camera housing is a T-shaped actuator lever 11 which has a hook-like element 12 on one branch thereof. As may be seen, hook-like element 12, when in the position indicated by the solid lines, engages a projection 10 to prevent movement of the sprocket wheel in the direction of arrow A. The other branch of the T-shaped actuator lever has disposed adjacent thereto a switch 13 which comprises a portion of the camera synchroflash circuitry. Also included in the circuit is a battery 14 and a synchronization switch 15. Synchronization switch 15 is of any known conventional construction which is adapted to be closed upon depression of the camera shutter release button 3 and opened upon release thereof by the operator. A wire lead 16 extends from the switch to terminal 17. Terminal 17 is positioned to engage a lead-in wire (not shown) of the forward lamp 6 in the multilamp flash attachment in the manner suggested by the aforementioned U.S. application Ser. No. 458,016. The other lead-in wire (not shown) of the lamp is in contact with terminal 18 which is grounded as indicated.

The device, as described, operates as follows. When actuator lever 11 is in the position indicated in solid lines, the flash attachment is held against rotation by the hook-shaped element 11. Also, since switch 13 is open, the synchroflash circuit will not be completed by closing of synchronization switch 15.

When, however, the lever 11 is manually moved to the position indicated in phantom, the attachment is free to rotate and closing of switch 13 completes the circuit to allow firing of the forward flash element.

In FIG. 3 is shown a similar arrangement. In this case, however, lever 11' has a substantially U-shaped operating end comprising arms 21 and 22; arm 21 cooperating with sprocket wheel 9' and arm 22 cooperating with switch 23. Movement of lever 11' to the position indicated in phantom allows switch 23 to close and releases sprocket wheel 9'. The forward facing bulb may then be fired and the attachment rotated as previously described.

In FIG. 3 is shown a similar arrangement. In this case, the invention. Camera 1 and multilamp flash attachment 5 are indicated in phantom. A shaft 30 is mounted for rotational movement in the camera housing in any suitable fashion. The socket assembly (not shown) and multilamp flash attachment 5 are fixedly attached to shaft 30 and move therewith. The lower portion of shaft 30 has rigidly mounted thereon one segment 31 of a positive clutch mechanism. The other segment 32 of the positive clutch mechanism is mounted by a keyway, or other suitable means (not shown), on drive shaft 33 so that segment 32 is free to slide up and down with respect thereto but is fixed for rotatable movement therewith. Drive shaft 33 is driven by a yieldable drive means (not shown) of the type previously described. An actuator lever 34 is mounted in the camera in any suitable fashion about a pivot member 35. Disposed for sliding movement on drive shaft 33 is pressure plate 36 which is continuously biased in an upward direction by coil spring 37 which has one end thereof positioned on drive shaft 33 in any suitable manner such as by resting on a disc 38 which is rigidly attached to drive shaft 33 at any desired position. Lever 34 is positioned so that pressure plate 36 continuously urges it in an upward direction. Lever 34 then bears against clutch segment 32 so that it engages upper segment 31. Movement of the lower segment 32 in the direction of arrow A will then rotate upper segment 32 to a like degree.

A switch 39, which is in the camera synchroflash circuit, is disposed adjacent an upturned foot of lever 34. Switch 39 is closed when lever 34 is in the position indicated in solid lines. When the switch is in this position current will flow from battery 14", through synchronization switch 15", switch 39 and thence through lamp 6 which has been connected to terminals 17", 18", when the shutter release button 3 has been depressed and shutter 40 actuates synchronization switch 15" in the well known manner.

Figure 5:
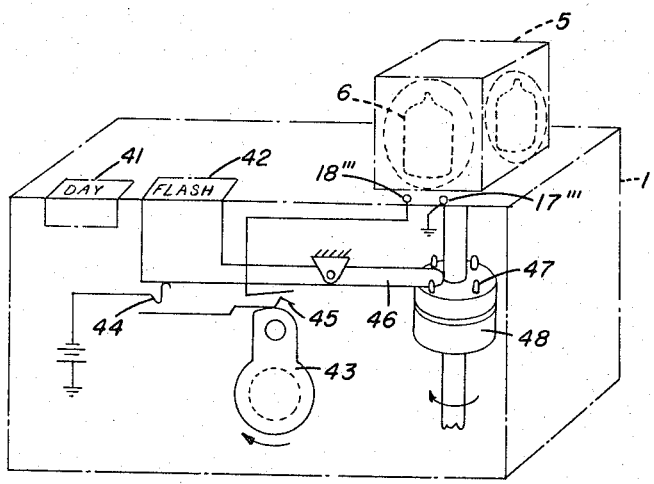
FIG. 5 is a view similar to that shown in FIG. 4 illustrating still another embodiment of the present invention.

In the embodiment shown in FIG. 5, rather than having a lever and a single shutter release button, two shutter release buttons are provided, one for flash operation and one for non-flash operation.

In FIG. 5 is disclosed an additional alternate embodiment of this invention. Camera 1 and multilamp flash assembly 5 are shown in phantom. In this embodiment, two shutter release buttons 41, 42 are utilized. Button 41 operates in the conventional manner, actuating shutter 43 through any known linkage means.

When, however, use of flash is desired, button 42 is depressed, which not only actuates the shutter, but closes the synchroflash circuit so that bulb 6 is actuated. Depression of button 42 closes switch 44 and actuates shutter 43 which in turn closes synchronization switch 45. Current then flows through the flash bulb terminals 17''', 18''' in the manner previously described, thus igniting bulb 6. Depression of button 42 also withdraws associated lever 46 from upstanding lugs 47 on the uppermost element of slip clutch 48. In this manner the multilamp flash attachment may be rotated after actuation of flash bulb 6.

Figure 6:
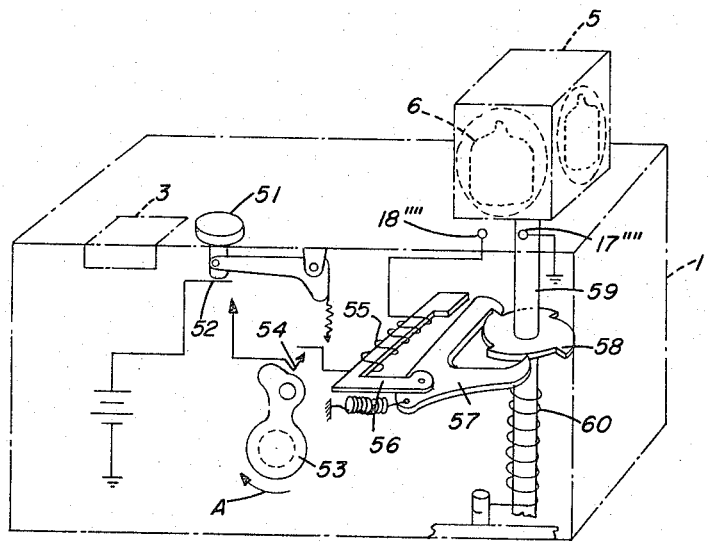
FIG. 6 is a view similar to that shown in FIG. 4 showing one additional embodiment.

The embodiment shown in FIG. 6 is somewhat similar to that of FIG. 5 except that the locking device is an integral part of the indexing means for the flash attachment. Further, in this embodiment the locking means is electromechanical rather than mechanical.

In FIG. 6 is shown still one more embodiment of the present invention. A conventional shutter release button 3 is again disclosed for conventional operation. A flash switch 51 is also disclosed for initiating flash operation and actuating the camera shutter mechanism. Depression of switch 51 by the operator closes switch 52 and deflects shutter 53 through a suitable linkage (not shown). Deflection of shutter 53 closes synchronization switch 54. Current then flows through wire coil 55 which is wrapped about core 56 and thence through bulb 6 through the expedient of terminals 17'''', 18''''.

Passage of current through coil 55 attracts spring biased escape mechanism 57 toward core 56. The resultant movement of escape mechanism 57 allows sprocket wheel 58, shaft 59 and the multilamp flash attachment 5 to rotate 90° under the influence of drive spring 60 which continuously biases shaft 59 in a clockwise direction.

The invention has been described in detail with particular reference to preferred embodiments thereof, but it will be understood that variations and modifications can be effected within the spirit and scope of the invention as described hereinabove and as defined in the appended claims. For example, a suitable linkage might be provided for disconnecting the socket drive upon removal of the multilamp attachment.

What is claimed is:

1. In a photographic camera of the type having an indexable, multilamp flash attachment, the combination comprising:
    locking means comprising a manually actuatable lever for movement from a first position to a second position;
    indexing means operably associated with said flash attachment for indexing therewith, said indexing means comprising a sprocket wheel having a series of projections thereon for selective engagement by a portion of said locking means;
    a synchroflash system in said camera having a switch disposed therein which is operatively associated with said locking means and
    said locking means when in said first position preventing indexing of said indexing means and permitting said switch to remain open and when in said second position releasing said indexing means to permit indexing thereof and closing said switch.

2. The combination according to claim 1 wherein said portion comprises a hook-like element for selectively engaging said projections.

3. In a photographic camera of the type having a rotatable, multilamp flash attachment, the combination comprising:
    a synchroflash system in said camera having a switch disposed therein;
    a first clutch element secured to said attachment for rotation therewith;
    a second clutch member operably associated with a drive mechanism for effecting rotary movement of said second clutch member;
    a manually operable lever movable from a first position to a second position;
    means associated with said lever for bringing said first clutch member into engagement with said second clutch member and for closing said switch when said lever is in said first position and for disengaging said clutch elements and for opening said switch when said lever is in said second position.

4. The combination according to claim 3 wherein a biasing means is provided for continuously urging said lever to said first position.

5. In a photographic camera of the type using an indexable, multilamp flash attachment, the combination comprising:
- a first shutter release means;
- indexing means operably associable with said flash attachment for indexing the attachment;
- a synchroflash system in said camera;
- locking means operably associated with said indexing means and said synchroflash system, said locking means being operable in a first condition to prevent indexing of the flash attachment and to prevent firing of a flash lamp, said locking means being operable in a second condition to permit indexing of the flash attachment and to permit firing of a flash lamp; and
- selector means operably associated with said locking means and located at least partially on the exterior of the camera to allow manual selection of one of said conditions of said locking means.

6. In a photographic camera of the type using an indexable, multilamp flash attachment, the combination comprising:
- a first shutter release means;
- indexing means operably associable with said flash attachment for indexing the attachment;
- a synchroflash circuit in said camera including a switch;
- locking means operably associated with said indexing means and said circuit and operable in a first position to prevent indexing of the flash attachment and to maintain said switch open, said locking means being operable in a second position to permit indexing of the flash attachment and to maintain said switch closed, said locking means being movable between said positions; and
- selector means operably associated with said locking means and located at least partially on the exterior of the camera for moving said locking means from one of said positions to the other.

7. The apparatus according to claim 6 wherein said selector means is a second shutter release means whereby the camera operator can choose between flash and non-flash operation with an in-place flash attachment by choosing between said first shutter release means and said second shutter release means.

8. The apparatus according to claim 6 wherein said locking means is a lever arm pivotable between said first and second positions, one end of said lever arm being adapted to open and close said switch and the other end of said lever arm being adapted to lock and unlock rotation of an indexing shaft connected to the flash attachment.

9. In a photographic camera of the type using an indexable, multilamp flash attachment, the combination comprising:
- a first shutter release means;
- a second shutter release means;
- an indexing means operably associable with said flash attachment for indexing the attachment;
- a synchroflash circuit in said camera including a normally open switch;
- locking means operably associated with said indexing means and operable in a first, normal position to prevent indexing of said flash attachment, said locking means being movable to a second position permitting indexing of said flash attachment; and
- means responsive to actuation of said second shutter release means for closing said switch and for moving said locking means to said second position.

10. The apparatus according to claim 9 wherein said locking means includes:
- a locking arm spring biased into locking engagement with said indexing means; and
- an electromagnet connected in series circuit with said switch and said flash attachment and adapted, when energized, to disengage said arm from said indexing means.

References Cited

UNITED STATES PATENTS

| | | | |
|---|---|---|---|
| 3,080,804 | 3/1963 | Steineck | 95—11.5 |
| 3,263,068 | 7/1966 | Jakob | 240—1.3 |
| 3,319,547 | 5/1967 | Parsons et al. | 240—37 X |
| 3,319,548 | 5/1967 | Kottler | 95—11 |

NORTON ANSHER, *Primary Examiner.*

F. L. BRAUN, *Assistant Examiner.*